United States Patent Office 3,718,636
Patented Feb. 27, 1973

3,718,636
CATALYSTS AND PROCESS FOR THE POLYMERIZATION OF OLEFINS
Jacques Stevens, Braine-l'Alleud, and Michel George, Brussels, Belgium, assignors to Solvay & Cie, Brussels, Belgium
No Drawing. Filed Jan. 22, 1970, Ser. No. 5,128
Claims priority, application France, Jan. 24, 1969, 6901486
Int. Cl. C08f 1/56, 3/06
U.S. Cl. 260—94.9 D          15 Claims

ABSTRACT OF THE DISCLOSURE

Catalysts for the low pressure polymerization and copolymerization of olefins are provided which comprise an activator which is an organometallic compound and a solid product obtained by reacting a support comprised of a solid bivalent metal compound with an organometallic compound, separating the resulting solid product, and then reacting this product with a halogenated derivative of a transition metal. The organometallic compound reacted with the support may be the same or different from the activating compound. The polymerization and copolymerization of olefins is carried out using these catalysts.

BACKGROUND OF THE INVENTION

This invention is directed to catalysts and to an improved process for the low pressure polymerization and copolymerization of olefins.

In Belgian Patents 650,679, dated July 17, 1964 and 705,220 of Oct. 17, 1967 various processes for the low pressure polymerization of olefins in the presence of solid catalysts have been described. These catalysts are prepared by reacting a solid bivalent metal compound with a liquid derivative of a transition metal, and are activated by means of an organometallic compound. When used for the polymerization of ethylene, they possess an exceptionally high activity and produce polyethylenes having a high linearity and melt indexes which can be varied within a very wide range.

For certain specific uses, polyethylenes having a low melt index and a wide distribution of molecular weights are required. The widening of the distribution of molecular weights can be obtained by adding to the polymerization medium substantial quantities of chain transfer agents of which hydrogen is the most generally used. However, these chain transfer agents are responsible for a significant increase of the melt index of the polymer. This can be counterbalanced by decreasing the polymerization temperature; however, the productivity of the reaction is then substantially reduced.

SUMMARY OF THE INVENTION

It has now been found that by using the novel catalysts according to the present invention, polyolefins having a wide distribution of molecular weights may be obtained even without using high concentrations of chain transfer agents and without carrying out the operation at low polymerization temperatures. In addition, the catalysts of the present invention are very active and contribute to high polymer productivities with respect to the polymerization installation.

The present invention concerns improved catalysts for the low pressure polymerization and copolymerization of olefins which comprises:
(a) An organometallic compound and
(b) A solid complex component obtained by reacting a solid bivalent metal compound with an impregnation agent which consists of an organometallic compound, separating the solid reaction product, and reacting the solid reaction product with a halogenated derivative of a transition metal.

DESCRIPTION OF THE PREFERRED EMBODIMENTS

According to the invention the new catalysts are used for the polymerization and copolymerization of olefins particularly α-olefins, such as for the production of polyethylene, polypropylene and copolymers of ethylene and propylene. Other α-olefins for example butene-1, hexene-1, octene-1, 4-methyl-pentene-1 and styrene can be polymerized and also used as comonomers for copolymerization according to the present process.

The polymerization and copolymerization may be carried out according to any known procedures: in gaseous phase, i.e. in the absence of a liquid medium, or in the presence of a dispersion agent in which the monomer is soluble. As the dispersion agent, an inert hydrocarbon, which is liquid under the polymerization conditions, or the monomers themselves which are maintained liquid under their saturated vapor pressure may be used.

The temperatures and pressures of polymerization and copolymerization are those generally employed in the art. Preferably, polymerization and copolymerization are carried out under a pressure in the range of about 1 to 100 kg./cm.$^2$ and at temperatures in the range of about 30 to 160° C. For instance, a suspension polymerization may be carried out in isobutane most preferably at 110° C., and in hexane at most preferably 50 to 95° C. However solution polymerization in cyclohexane may be carried out at a temperature as high as 150–160° C. The pressure varies according to the temperature and the nature of the diluent from about 1 kg./cm.$^2$ in hexane at 50° C. to about 30 kg./cm.$^2$ and even more for the polymerization performed in isobutane at 110° C. and in cyclohexane at 160° C.

Depending on the temperature under which the polymerization is carried out and the nature of the polymerization medium, the polymer may be dissolved in the polymerization medium or dispersed therein in the form of solid particles.

The dispersion process is particularly economical since it allows the operation to be carried out at a lower temperature and well formed polymer particles may be recovered.

The catalysts, according to the process of the invention are comprised of two components. The first of these components is an organometallic compound selected from the group consisting of the organic derivatives of the metals of the Groups Ia, IIa, IIb, IIIa and IVa of the Periodic Table wherein the derivative has at least one metal carbon bond. Organometallic halides, dihalides, sesquihalides and hydrides as well as completely alkylated derivatives of these metals may be used.

Among others, compounds of formula M'R$_q$Y$_{p-q}$ may be used wherein M' is a metal of Groups Ia, IIa, IIb, IIIa or IVa, R is a hydrocarbon radical selected from branched and unbranched alkyl radicals, alkenyl, cycloalkyl, aryl, alkylaryl or arylalkyl radicals containing 1 to 20 carbon atoms and Y is a monovalent radical selected from the halogens, hydrogen and alkoxy and dialkylamino radicals, $p$ is the valence of M' and $q$ an integer such that $1 \leq q \leq p$.

By way of examples, dialkylaluminum halides alkylmagnesium halides, alkylaluminum hydrides, alkyltin hydrides and organosilicon compounds having at least one Si—H bond and monoalkoxydialkylaluminums such as ethoxydiethylaluminum may be mentioned. Preferably the metal is selected from Group IIIa and is most preferably an aluminum compound such as dialkylaluminum chloride, alkylaluminum dichloride, trialkylaluminum, alkylmagnesium chloride, and dialkylaluminum hydride, wherein alkyl group has up to 16 carbon atoms and preferably 1–5 carbon atoms are particularly useful.

The trialkylaluminums such as trimethylaluminum, triethylaluminum, triisobutylaluminum, tri-n-octylaluminum, tri-n-dodecylaluminum, the halides of dialkylaluminums such as diethylaluminum chloride or fluoride are particularly desirable. However, the alkyl zinc, the alkyl lithium and the alkyl tin hydrides also yield useful catalysts. Triisobutyl aluminum is the most preferred activator.

The second component of the catalysts according to the invention is a solid complex obtained by treatment of a solid support with an organometallic compound and then with a transition metal compound. The solid support is a bivalent metal compound. It is preferably selected from the group consisting of calcium, zinc, manganese, cobalt or nickel and magnesium compounds; calcium and magnesium compounds are preferred; mixed compounds of two or more bivalent metals may also be used. The compounds suitable for solid supports include hydroxychlorides, partially hydroxylated halides, oxides, hydroxides, alcoholates and salts of inorganic oxyacids, for example, sulfates, nitrates, phosphates, carbonates and silicates. For example, MgOHCl, partially hydroxylated $MgCl_2$ and $CaCl_2$, MgO, CaO, $Mg(OC_2H_5)_2$, and the sulfates, carbonates, nitrates, phosphates and silicates of Mg and Ca are desirable supports. The salts of mono- and polycarboxylic organic acids are also suitable supports.

The nature of the solid support has a notable influence on the productivity of the catalyst and the characteristics of the polymer. For example, in the polymerization of ethylene, magnesium hydroxychloride has a very high activity. On the other hand, magnesium oxide is less active but leads to the formation of polymers which, for an average width of distribution of molecular weights, possess some of the favorable properties of the products having wider distributions of the molecular weights, in particular with respect to the melt fracture phenomenon. To produce polymers having a narrow distribution of molecular weights, it has been found that magnesium alcoholate has an extremely high activity.

Before the impregnation step, i.e. treatment with an organometallic compound, the supports are extensively heated at high temperature. This results in a thorough drying and possibly an activation of the supports. It is indeed essential that the solid supports be well dried before being impregnated since the impregnation agent usually reacts with water. Generally drying is carried out at a temperature above 110° C. for about 5–20 hours. For carbonates which are to be decomposed into oxides, a temperature of about 400°–700° C., and preferably 450°–600° C. is used.

The granulometry of the solid support is not critical. However, in order to prevent plugging which can occur if the support particles are too fine, supports which provide a free-flowing catalyst are preferred. Thus supports which are in the form of relatively coarse granules, i.e. wherein the granulometry is between about 40 and 140 microns are generally used.

For impregnation, the solid support may be suspended in a diluent which is inert towards organometallic compounds. The diluent is generally an alkane or a cycloalkane, for example hexane or cyclohexane. The operation is preferably carried out in a closed container which is flushed with an inert gas such as nitrogen and is stirred during the entire period of impregnation.

The impregnation agent is added as such or while dissolved in a solvent, to the suspension of solid support in the diluent. The solvent may be identical to the diluent which is used to suspend the support.

The impregnation agent is an organometallic compound of the same type as the activator component of the catalyst. Consequently, the impregnation agent is also selected from the group consisting of the organic derivatives of the metals of the Groups Ia, IIa, IIb, IIIa or IVa of the Periodic Table as set forth above and include for example organometallic halides and hydrides as well as completely alkylated derivatives of these metals. Trialkylaluminum compounds are preferred, however dialkylaluminum halides, as well as alkylmagnesium halides, alkylaluminum hydrides, alkyltin hydrides and organometallic compounds of silicon having at least one Si—H bond may also be used. The impregnation agent may be the same as the first component of the catalyst or it may be different.

The productivity of the catalyst and the physical properties of the polymer are dependent on the nature of the impregnation agent. For example, in the polymerization of ethylene, trialkylaluminum compounds in which the alkyl radicals have only one or two carbon atoms are responsible for the production of polymers having higher melt indexes than those in which the alkyl radicals comprise four carbon atoms or more.

The period of impregnation is not critical but may also have some influence on the performance of the catalyst. In most cases a 30 minute impregnation seems to be sufficient, however considerably shorter periods of impregnation, i.e. 5 minutes or less are also effective according to the present invention and longer treatments may also be employed, although usually there is no particular benefit obtained by extending the time of treatment substantially beyond a period of about 30 minutes to 1 hour. During the entire period of impregnation, the suspension of solid support is kept at a temperature between room temperature and the boiling temperature of the diluent under normal pressure. Preferably, the temperature is kept between 25° and 60° C.

The concentration of the organometallic impregnation agent in the suspension is not critical as long as the lower limit corresponding to the total quantity of impregnation agent which can be bonded on the support is exceeded. On the other hand, it is not absolutely necessary to suspend the solid support, in an inert diluent as stated above. The solid support may be suspended directly in the impregnation agent, if liquid.

At the end of the impregnation period, agitation is stopped and the impregnated support is separated, for example by filtration, and is then washed with an inert solvent in order to eliminate the excess impregnation agent.

During the next stage in which the preparation of the second component of the catalyst is completed, the impregnated solid support is treated with a halogenated derivative of a transition metal. This treatment is preferably carried out in the absence of diluent, while the solid support is suspended in the halogenated derivative of transition metal which is kept liquid at the operating temperature. This temperature is usually between 40° and 180° C. The treatment must be carried out in the absence of humidity. It generally lasts for about 1 hour after which the treated support is washed with an inert diluent in order to eliminate the excess halogenated derivative of transition metal which is not bonded to the support. The solid support may then be dried for example in an inert gas stream. In this manner, the second component of the polymerization catalyst is obtained. According to the invention, any liquid halogen derivative of a transition metal is used. The halogenated derivatives of transition metals generally employed for the treatment of the impregnated solid supports are selected from the group consisting of chlorides, bromides and oxyhalides of the metals of the Groups IVb, Vb and VIb of the Periodic Table, and particularly include the chlorinated derivatives of titanium and vanadium such as $TiCl_4$, $VCl_4$ or $VOCl_3$, however other halogen compounds can also be used including $CrO_2Cl_2$.

After the impregnation with an organometallic compound and the treatment with a halogenated derivative of a transition metal, the solid support, the organometallic compound and the halogenated derivatives are chemically bonded. None of these components of the activated complex can then be separated by physical means such as by washing with solvents.

The amount of active components in the complex catalyst component has some influence on the properties of the polymer formed. In general, it has been found that the higher the amount of transition metal derivative in the complex, the higher the critical shearing stress and the lower the number of long chain branchings.

The amount of organometallic compound used as the activating or first catalyst component to be used during polymerization is not critical. However, the polymerization medium must contain a molar excess of activator with respect to the amount of transition metal chemically bonded to the solid support. The molar ratio between the activating component and the transition metal is preferably between 10 and 200.

The solid complex catalyst component, which is the second component of the catalyst, is contacted with the organometallic compound in the polymerization enclosure, or prior to said introduction. The activated complex can be aged at room temperature or higher in contact with the organometallic compound.

The polymerization and copolymerization of olefins can be carried out according to any known manner: continuously or batchwise, in gaseous phase, i.e. in the absence of any liquid medium, or in the presence of a dispersion medium in which the monomer is soluble. The liquid dispersion medium may include an inert hydrocarbon which is liquid under the polymerization conditions, or the monomers themselves, which are kept liquid under their saturated vapor pressure.

The process according to the invention is particularly suitable for the homopolymerization of ethylene and the copolymerization of ethylene with other olefins such as propylene, butene-1, etc.

The catalysts according to the present invention are extremely active. As a result, catalytic residues are found in such low concentration with respect to the polymer that their presence is never ditrimental. Therefore, it is not necessary to purify the polymers obtained by the process of this invention.

By using the catalysts of the invention, it is possible to produce a polyethylene having a low melt index and a wide distribution of molecular weights, and this is possible without having to carry out the polymerization at temperatures lower than those used for the production of polyolefins having a high melt index and a narrow distribution of molecular weights.

It is therefore possible to carry out the polymerization in substantially identical installations independent of the type of polymer which is produced.

The invention is further illustrated by means of the following examples, except examples including the letter R which are reference examples included for comparison purposes. The examples of the present invention illustrate the best mode currently contemplated for carrying out the process of the present invention but must not be construed as limiting the invention in any manner.

Example 1R

This example is given by way of reference. The solid component of the catalyst has not been submitted to impregnation with an organometallic compound.

Hydromagnesite of the formula $$3MgCO_3 \cdot Mg(OH)_2 \cdot 3H_2O$$

is heated to 500° C. for 16 hours under a dry flow of nitrogen. Twenty g. of the magnesium oxide formed in this manner are withdrawn and treated directly with pure $TiCl_4$ which has been heated under reflux at 130° C. for 1 hour. The solid product obtained is washed with hexane and dried under a dry flow of nitrogen. The quantity of Ti which is bonded to the support is 20 mg./g. of support. 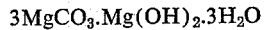lymerization conditions, polymers having a much wider above and 100 mg. of triisobutyl aluminum are introduced into a 1.5 liter autoclave containing 0.5 liter of hexane. The autoclave is made of stainless steel and is provided with a blade stirrer. The temperature is raised to 85° C. after which ethylene and hydrogen are introduced. The partial pressures of these two gases are respectively 10 and 4 kg./cm.$^2$.

The temperature is kept constant for 1 hour and the pressure is also maintained contant by adding ethylene. After removing the gases from the autoclave, 132 g. of a polyethylene are obtained having a density of 0.958 and a melt index of 0.20 (ASTM D 1505–57T and ISO/R 292–1963 norms). This corresponds to an activity per hour of 240 g. of polymer/atm. $C_2H_4$ and g. of support or 12,000 g. of polymer/h. atm. $C_2H_4$ and g. of Ti. The distribution of molecular weights is determined for this polyethylene by gel permeation chromatography on a solution in 1,2,4-trichlorobenzene containing 1 g. of polyethlene per kg. The ratio between average molecular weights in weight and in number is equal to 8. The critical shearing stress at which the extruded ring becomes rough (melt fracture phenomenon) is measured in a melt index measuring apparatus provided with a specially adapted die (length: 2 mm. instead of 8). This stress is $7.7 \times 10^6$ dynes/cm.$^2$.

Example 2

Hydromagnesite of the formula $$3MgCO_3 \cdot Mg(OH)_2 \cdot 3H_2O$$

is heated to a temperature of 500° C. for 16 hours under 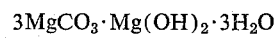 a moist flow of nitrogen. Twenty g. of the magnesium oxide formed are withdrawn and suspended in 100 cm.$^5$ of hexane under nitrogen. The suspension is heated to 25° C. and there are added dropwise, 4.2 g. of triethylaluminum in a solution in hexane having a concentration of 500 g. per liter. The mixture is stirred and the temperature is kept constant during a period of 30 minutes.

After drying and washing with hexane, the solid impregnated product is submitted to a treatment with $TiCl_4$ which has been heated under reflux at 130° C. for 1 hour. The solid product resulting from this treatment is then washed with hexane and dried under a dry flow of nitrogen. It contains 37 mg. of Ti and 14 mg. of Al per g. of support.

Sixty-five mg. of the solid compound formed are introduced along with 100 mg. of triisobutylaluminum in a 1.5 liter autoclave which contains 0.5 liter of hexane. The autoclave is made with stainless steel and is provided with a blade stirrer. The temperature of the apparatus is raised to 85° C. and ethylene and hydrogen are introduced under respective partial pressures of 10 and 4 kg./cm.$^2$.

The temperature is kept constant for 1 hour and the pressure is also kept constant by adding ethylene. After removing the gases from the autoclave, there are obtained 65 g. of a polyethylene in which the density and the melt index measured as indicated in Example 1 are respectively 0.959 and 0.25. This corresponds to an activity per hour of 100 g. of polymer/atm. $C_2H_4$ and g. of support or 2760 g. of polymer/atm. $C_2H_4$ and g. of Ti. Measured under the same conditions as in Example 1, the ratio between the average molecular weights in weight and in number is equal to 16 and the melt fracture phenomenon does not appear even if the shearing stress is increased to $11.5 \times 10^6$ dynes/cm.$^2$, which are the limits of the possibilities of the apparatus.

If the polyethylene obtained is compared with the one produced in Example 1, it is apparent that the density and the melt index are substantially equivalent but that the distribution of molecular weight is much wider. The impregntaed catalysts according to the process of the invention thus provide under substantially identical po-
Fifty-five mg. of the solid product obtained as described distribution of molecular weight. The consequence of this widening is that it is possible to increase the speed of extrusion of the polymer during processing and consequently to substantially improve the productivity of the fabricating equipment. This is illustrated by the significant increase of the shearing rate which can be obtained during extrusion without producing a melt fracture.

Example 3

The preparation of the catalyst and the polymerization are caried out as in Example 2 except that the impregnation of the magnesium oxide which is in suspension in hexane is made in the presence of 2.7 g. of trimethylaluminum. The solid product resulting from this treatment contains 37 mg. of Ti/g. of support and 19 mg. of Al/g. of support.

Fifty-three g. of polyethylene are obtained, the physical properties of which are determined as in Example 1. The density is 0.959, the melt index 0.20, the ratio of molecular weights 17.3 and melt fracture does not appear when the shearing stress is increased up to a value of $11.5 \times 10^6$ dynes/cm.$^2$. The activity per hour of the catalyst is 81 g. of polymer/atm. of $C_2H_4$ and g. of support or 2200 g. of polymer/h. per g. of Ti and atm. $C_2H_4$.

It is evident that by varying the nature of the organometallic compound used for impregnating the support, the properties of the polymer and particularly the distribution of the molecular weights may be modified.

Example 4

The preparation of the catalyst and the polymerization are carried out as in Example 2 except that the impregnation of magnesium oxide in suspension in hexane is carried out in the presence of 3.5 g. of a compound called isoprenylaluminum and obtained by reacting isoprene with triisobutylaluminum. This product is characterized by a $C_5$ hydrocarbon/$C_4$ hydrocarbon ratio of 2.6 in the gases of hydrolysis. The solid product obtained by this treatment contains 37 mg. of Ti/g. of support and 11 mg. of Al/g. of support.

Fifty-one g. of a polyethylene are obtained in which the physical properties are determined as in Example 1R. The density is 0.959, the melt index is 0.11, the $C_d$ factor is 7 and there is no melt fracture even when the shearing stress attains $11.5 \times 10^6$ dynes/cm.$^2$. The activity per hour of the catalyst is 79 g. of polymer/atm. of $C_2H_4$ and g. of support or 2140 g. of polymer/atm. of $C_2H_4$ and g. of Ti.

It is apparent that the use of alkyl derivatives of aluminum having a relatively long chain as impregnation agents produce polymers having a lower melt index compared to the use of relatively short chain alkyl derivatives of aluminum.

Example 5

The preparation of the catalyst and the polymerization are carried out as in Example 2 except that the period of impregnation of magnesium oxide is shortened to 5 minutes, instead of 30. The solid product obtained from this treatment contains 46 mg. of Ti/g. of support and 15 mg. of Al/g. of support.

There are obtained 58 g. of a polyethylene the properties of which are determined as in Example 1. The density is 0.960, the melt index is 0.20, the $C_d$ factor is 7.5 and melt fracture does not appear even when the shearing stress reaches $11.5 \times 10^6$ dynes/cm.$^2$. The activity per hour of the catalyst is 78 g. of polymer/atm. of $C_2H_4$ and g. of support or 1700 g. of polymer/atm. of $C_2H_4$ and g. of Ti.

It is evident that the duration of the impregnation has practically no influence on the properties of the polymer. It should be noted however that there is a slight decrease of the activity of the catalyst as well as a lowering of the melt index.

Example 6

The preparation of the catalyst and the polymerization are carried out as in Example 2 except that the impregnation of magnesium oxide in suspension in hexane is carried out at 60° C. instead of 25° C. The solid product obtained from this treatment contains 45 mg. of Ti/g. of support and 15 mg. of Al/g. of support.

There are obtained 66 g. of a polyethylene in which the physical properties are determined as in Example 1R. The melt index is 0.22 and melt fracture does not appear when the shearing stress is increased up to a value of 11.5 dynes/cm.$^2$. The activity per hour of the catalyst is 101 g. of polymer/atm. of $C_2H_4$ and g. of support or 2080 g. of polymer/atm. of $C_2H_4$ and g. of Ti.

It is apparent that a modification of the temperature of impregnation of the support has only little influence on the characteristics of the polymer.

Example 7

The preparation of the catalyst and the polymerization are carried out as in Example 2 except that hydromagnesite is heated for 16 hours under a dry flow of nitrogen at a temperature of 560° C., instead of 500° C. The solid product resulting from this treatment contains 34 mg. of Ti/g. of support and 9 mg. of Al/g. of support.

There are obtained 73 g. of a polyethylene in which the physical properties are determined as in Example 1R. The melt index is 0.20, the $C_d$ factor is 6 and melt fracture appears only when shearing stress attains the value of $10.5 \times 10^6$ dynes/cm.$^2$. The activity per hour of the catalyst is 98 g. of polymer/atm. of $C_2H_4$ and g. of support or 2880 g. of polymer/atm. of $C_2H_4$ and g. of Ti.

It is evident that the temperature of activation of the solid support has some influence on the distribution of molecular weights. In the particular case of magnesium oxide, the higher the temperature is, the narrower the distribution.

Example 8

The preparation of the catalyst and the polymerization are carried out as in Example 2 except that the solid support consists of magnesium hydroxychloride which has been dried in a drying oven. This solid compound in an amount of 150 mg. are introduced into the polymerization reactor. It contains 4 mg. of Ti/g. of support and 1.1 mg. of Al/g. of support.

There are obtained 160 g. of a polyethylene in which the physical properties are determined as in Example 1R. The melt index is 0.69, the $C_d$ factor is 8 and melt fracture appears when the shearing stress attains $7.3 \times 10^6$ dynes/cm.$^2$. The activity per hour of the catalyst is 107 g. of polymer/atm. of $C_2H_4$ and g. of support or 27,600 g. of polymer/atm. of $C_2H_4$ and g. of Ti.

It is apparent that the nature of the solid support has a notable influence on the physical properties of the polymer. Particularly, magnesium hydroxychloride leads to polyethylenes having higher melt indexes and narrower molecular weight distributions than magnesium oxide.

Example 9

The preparation of the catalyst and the polymerization are carried out as in Example 2 except that the reactor is supplied with 110 mg. of triethyl aluminum instead of 100 mg. of triisobutyl aluminum. The solid product resulting from this treatment contains 6 mg. of Ti/g. of support and 7 mg. of Al/g. of support.

There are obtained 59 g. of a polyethylene in which the physical properties are determined as in Example 1R. The density is 0.962, the melt index is 0.87 and melt fracture appears when the shearing stress reaches $7.7 \times 10^6$ dynes/cm.$^2$. The activity per hour of the catalyst is 14 g. of polymer/atm. of $C_2H_4$ and g. of support or 2200 g. of polymer/atm. of $C_2H_4$ and g. of Ti.

It is evident that the nature of the first component or activator of the catalyst has a notable influence on the properties of the polymer. Compared with triisobutyl aluminum, triethyl aluminum leads to polymers in which the melt index is higher and the distribution of the molecular weights is narrower.

Example 10

Into a solution containing 10 g. of $Al(C_2H_5)_2F$ in 7.3 g. of hexane, there are introduced 11 g. of magneisum ethylate.

The suspension is heated at its boiling point for 30 minutes followed by filtering. The solid product which separates is washed in hexane and dried under a flow of nitrogen at a temperature of 60° C. for 1 hour.

The magnesium ethylate which has been impregnated with $Al(C_2H_5)_2F$ is treated with $TiCl_4$ which has been heated under reflux for 1 hour. After washing with hexane until elimination of all traces of chloride, the solid product is treated under a dry flow of nitrogen.

The solid product obtained contains 230 g. of Mg, 1 g. of Al, 3.7 g. of F, 28 g. of Ti and 727 g. of Cl per kg. The atomic ratio Al/Ti is 0.05.

Ten mg. of the above solid product are introduced in a 1.5 liter autoclave containing 0.5 liter of hexane and 200 mg. of $Al(i.C_4H_9)_3$. The ratio between the activator and the bonded titanium expressed as the atomic ratio Al/Ti is equal to 182. The polymerization is carried out under the conditions described in Example 1R.

These are obtained 149 g. of polyethylene, which corresponds to a specific activity of 53,500 g. of polyethylene/h. and per g. Ti and kg./cm.$^2$ of ethylene.

The polyethylene obtained is characterized by a melt index of 0.43 g./10 minutes, a $C_d$ factor of 6, and a critical shearing stress of 6 to $7 \times 10^6$ dynes/cm.$^2$.

The magnesium ethylate which has been impregnated with diethylaluminum fluoride yields a very active catalyst responsible for the production of polymers having relatively high melt indexes and in which the distribution of molecular weights is very narrow. However, the critical shearing stress is lower than that of polyethylenes produced by previous methods.

Example 11

Ten g. of magnesium ethylate are introduced into a certain amount of a solution containing 11 g. of $Al(C_2H_5)_2Cl$ and 7.3 g. of hexane and the process is then carried out as described in Example 10.

The solid product obtained contains 191 g. of Mg, 6.6 g. of Al, 56 g. of Ti and 659 g. of Cl per kg. The atomic ratio Al/Ti is 0.21.

Eight mg. of this product are introduced into a 1.5 liter autoclave containing 0.5 liter of hexane and 200 mg. of $Al(i.C_4H_9)_3$. The atomic ratio between the activator and the bonded titanium expressed as the atomic ratio Al/Ti is 114. The polymerization is carried out under the conditions defined in Example 1R.

The amount of polyethylene obtained is 133 g. which corresponds to a specific activity of 29,700 g. of polyethylene/h. and per g. of Ti and kg./cm.$^2$ of ethylene.

The polyethylene obtained has a melt index of 1.55 g./10 minutes.

The nature of the organometallic compound used during the first impregnation of magnesium alcoholate in the preparation of the solid complex has an influence on the properties of the polymer.

For example, diethylaluminum chloride is responsible for the product of polymers in which the melt index is higher than that of polymers produced using diethylaluminum fluoride.

Example 12

Eleven mg. of the product obtained in Example 11 are introduced into a 1.5 liter autoclave containing 0.5 liter of hexane and 190 mg. of $Al(C_2H_5)_2Cl$. The ratio between the activator and the bonded titanium expressed as the atomic ratio Al/Ti is 122. The polymerization is carried out under the same conditions as in Example 1.

Fifty-eight g. of polyethylene having a melt index under high load (HIMI) of 2.7 g./10 minutes are produced.

The corresponding specific activity is 9420 g. of polyethylene/h. and per g. of Ti and kg./cm.$^2$ of ethylene.

It is evident that when using diethylaluminum chloride as an activator, higher molecular weight polymers are produced than when using triisobutyl aluminum.

The activity of the catalyst containing magnesium ethylate is still quite acceptable.

Example 13

A light weight hydromagnesite of the formula $3MgCO_3 \cdot Mg(OH)_2 \cdot 3H_2O$ is heated to 450° C. for 16 hours under a flow of moist nitrogen. 5 g. of the magnesium oxide thus formed are suspended under a nitrogen atmosphere in 82.5 ml. of hexane containing 80 g. per liter of triisobutyl aluminum. The specific surface BET of this magnesium oxide is 213 m.$^2$/g.

The mixture is stirred and the temperature is kept constant for 30 minutes. The solid product obtained is dried and washed with hexane containing 499 mg. of magnesium and 37 mg. of aluminum per g. of support and its specific surface BET is 180 m.$^2$/g.

The solid product resulting from the impregnation is treated with $TiCl_4$ which has been heated under reflux at a temperature of 136° C. for 1 hour. The solid product obtained from this treatment is then washed with hexane and dried under a dry flow of nitrogen. It contains 341 mg. of Mg, 22 mg. of Al, 42 mg. of Ti and 336 mg. of Cl and has a specific surface BET of 113 m.$^2$/g.

Twenty three mg. of the solid compound formed are introduced along with 200 mg. of trrisobutyl aluminum and 1.4 g. of butene-1 into a 1.5 liter autoclave containing 0.5 liter of hexane. The autoclave is made of stainless steel and is provided with a blade stirrer. The temperature is raised to 60° C. and ethylene and hydrogen are introduced under respective partial pressures of 10 and 5 kg./cm.$^2$.

The temperature is maintained constant and the pressure is also maintained constant by adding ethylene. The reaction lasts 1 hour.

After removing the gases from the autoclave, there are obtained 52 g. of a copolymer in which the density and the melt index are respectively 0.952 and 0.1.

The corresponding activity is 226 g. of copolymer/h. and per g. of support and kg./cm.$^2$ of ethylene or 5400 g. of copolymer/h. and g. of Ti and kg./cm.$^2$ of ethylene.

Example 14

Eight g. of magnesium oxide as in Example 13 are suspended in 95 ml. of a solution containing 50 g./ml. of ethylmagnesium chloride in ether. The suspension is kept to room temperature for 30 minutes. After filtration and washing with ether, the solid product obtained by impregnation which contains 492 g. of Mg and 81 g. of Cl per kg. of support is treated with pure $TiCl_4$ as in Example 10.

The solid product resulting from this treatment contains 284 g. of Mg, 107 g. of Ti and 383 g. of Cl per kg. of impregnated support.

The copolymerization is carried out under the same conditions as in Example 13.

There are obtained 24 g. of a copolymer having a density of 0.950 and a melt index of 0.08 which corresponds to an activity of 56 g. of copolymer/h. and per g. support and kg./cm.$^2$ of ethylene or 525 g. of copolymer/h. and per g. of Ti and kg./cm.$^2$ of ethylene.

Example 15

The preparation of the impregnated support is carried out as described in Example 14.

Forty-five mg. of the impregnated support are introduced along with 200 mg. of triisobutyl aluminum and 1.4 g. of butene-1 in a 1.5 liter autoclave which contains 0.5 liter of hexane. The stainless steel autoclave is provided with a blade stirrer. Copolymerization is carried out as in Example 1R. The temperature of the apparatus is raised to 60° C. and ethylene is introduced so that its partial pressure is 10 kg./cm.$^2$. Also hydrogen is introduced under a partial pressure of 5 kg./cm.$^2$.

There are obtained 50 g. of a copolymer having a density of 0.956 and a melt index of 0.49. The corresponding activity is 111 g. of copolymer/h. and per g. of support and kg./cm.$^2$ of ethylene or 1000 g. of copolymer/h. per g. of Ti and per kg./cm.$^2$ of ethylene.

What we claim and desire to secure by Letters Patent is:

1. A solid catalyst component obtained by reacting a support consisting of a solid compound selected from the group consisting of hydroxylated halides, oxides, hydroxides, alcoholates, monocarboxylic acid salts, polycarboxylic acid salts and inorganic oxyacid salts of magnesium with an organometallic compound of the formula $M'R_qY_{p-q}$, wherein $M'$ is a metal of the Groups I$a$, II$a$, II$b$, III$a$ and IV$a$ of the Periodic Table and R is a hydrocarbon radical selected from branched and unbranched alkyl radicals, alkenyl, cycloalkyl, aryl, alkylaryl, or arylalkyl radicals containing 1 to 20 carbon atoms and Y is a monovalent radical selected from the halogens, hydrogen and alkoxy and dialkylamino radicals, $p$ is the valence of $M'$ and $q$ an integer such that $1 \leq q \leq p$, the amount of organometallic compound present during said reaction being in excess of that which can be bonded on said support, separating the solid product resulting from the reaction, washing said solid product with an inert solvent to remove excess organometallic compound, reacting this product with a liquid halogenated derivative of a transition metal of Groups IV$b$, V$b$ or VI$b$ of the Periodic Table and washing said product with an inert solvent to remove excess transition metal compound which is not bound to said support.

2. Catalyst component according to claim 1 in which the halogenated derivative of a transition metal is selected from the group consisting of chlorides, bromides and oxyhalides of the metals of Groups IV$b$, V$b$, and VI$b$ of the Periodic Table.

3. Catalyst component according to claim 1 in which the reaction with a transition metal derivative is carried out in the absence of liquid diluent.

4. Catalyst component according to claim 1 in which the organometallic compound reacted with the support is selected from the group consisting of alkyl derivatives of aluminum and alkyl magnesium halides.

5. A method for the preparation of a catalyst which comprises reacting a support which consists of a solid compound selected from the group consisting of hydroxylated halides, oxides, hydroxides, alcoholates, monocarboxylic acid salts, polycarboxylic acid salts and inorganic oxyacid salts of magnesium with an organometallic compound of the formula $M'R_qY_{p-q}$, wherein $M'$ is a metal of the Groups I$a$, II$a$, II$b$, III$a$ and IV$a$ of the Periodic Table, R is a hydrocarbon radical selected from branched and unbranched alkyl radicals, alkenyl, cycloalkyl, aryl, alkylaryl or arylalkyl radicals containing 1 to 20 carbon atoms and Y is a monovalent radical selected from the halogens, hydrogen and alkoxy and dialkylamino radicals, $p$ is the valence of $M'$ and $q$ an integer such that $1 \leq q \leq p$, the amount of organometallic compound present during said reacting being in excess of that which can be bonded on said support, separating the solid product resulting from the reaction, washing said solid product with an inert solvent to remove excess organometallic compound, reacting this product with a liquid halogenated derivative of a transition metal of Group IV$b$, V$b$ or VI$b$ of the Periodic Table, and then combining the resultant product with an activating compound which is an organometallic compound of the formula $M'R_qY_{p-q}$, as defined above.

6. A method for the preparation of a catalyst according to claim 5 in which the reaction of said support with said organometallic compound is carried out at a temperature of about 25 to 60° C.

7. Catalyst for the low pressure polymerization and copolymerization of olefins comprising, (a) an activating component which is an organometallic compound of the formula $M'R_qY_{q-p}$ wherein $M'$ is a metal of the Groups I$a$, II$a$, II$b$, III$a$ and IV$a$ of the Periodic Table and R is a hydrocarbon radical selected from branched and unbranched alkyl radicals, alkenyl, cycloalkyl, aryl, alkylaryl or arylalkyl radicals containing 1 to 20 carbon atoms and Y is a monovalent radical selected from the halogens, hydrogen and alkoxy and dialkylamino radicals, $p$ is the valence of $M'$ and $q$ an integer such that $1 \leq q \leq p$, (b) a solid complex component obtained by reacting a support consisting of a solid compound selected from the group consisting of hydroxylated halides, oxides, hydroxides, alcoholates, monocarboxylic acid salts, polycarboxylic acid salts and inorganic oxyacid salts of magnesium, with an organometallic compound selected from the group consisting of alkyl derivatives of aluminum selected from the group consisting of alkylaluminum dichloride, dialkylaluminum chloride, dialkylaluminum hydride and trialkylaluminum wherein the alkyl radicals have up to 16 carbon atoms and alkyl magnesium halides, said organometallic compound being the same as or different from said activating component, the amount of organometallic compound present during said reaction being in excess of that which can be bonded on said support, separating the solid product resulting from the reaction, washing said solid product with an inert solvent to remove excess organometallic compound and reacting this product with a liquid halogenated derivative of a transition metal selected from the group consisting of chlorides, bromides and oxyhalides of the metals of Group IV$b$, V$b$ or VI$b$ of the Periodic Table, whereby a complex is obtained, said support, said organometallic compound and the transition metal compound being chemically bonded therein.

8. Catalyst according to claim 7 in which the reaction with a transition metal derivative is carried out in the absence of liquid diluent.

9. Catalyst according to claim 7 in which the activating component is an alkyl derivative of aluminum selected from the group consisting of alkylaluminum dichloride, dialkylaluminum chloride, dialkylaluminum hydride and trialkylaluminum wherein the alkyl radicals have up to 16 carbon atoms.

10. Catalyst according to claim 7, in which the organometallic compound reacted with the support is selected from the group consisting of alkyl derivatives of aluminum selected from the group consisting of alkylaluminum dichloride, dialkylaluminum chloride, dialkylaluminum hydride and trialkylaluminum wherein the alkyl radicals have up to 16 carbon atoms and alkyl magnesium halides.

11. Catalyst according to claim 7 in which the soliid compound of a bivalent metal is selected from the group consisting of hydroxylated halides, oxides, hydroxides, alcoholates and inorganic oxyacid salts of magnesium.

12. Catalyst according to claim 7 in which said bivalent metal compound is an alcoholate of magnesium.

13. Catalyst according to claim 12 in which the reaction with a transition metal derivative is carried out in the absence of liquid diluent.

14. Process for the low pressure polymerization and copolymerization of α-olefins which comprises polymerizing and copolymerizing said olefins in the presence of a catalyst as defined in claim 7.

15. Process for the low pressure polymerization of ethylene which comprises polymerizing ethylene in the presence of a catalyst as defined in claim 7.

References Cited
UNITED STATES PATENTS

| | | | |
|---|---|---|---|
| 3,166,542 | 1/1965 | Orzechowski et al. | 260—93.7 |
| 3,202,645 | 8/1965 | Yancey | 260—93.7 |
| 3,288,720 | 11/1966 | Moretti et al. | 252—429 |
| 3,070,549 | 12/1962 | Ziegler et al. | 260—94.9 |
| 3,553,287 | 1/1971 | Delbouille et al. | 260—94.9 |

FOREIGN PATENTS

| | | |
|---|---|---|
| 910,261 | 11/1962 | Great Britain. |
| 6714024 | 4/1968 | Netherlands. |

OTHER REFERENCES

Zeiss: Organometallic Chemistry, Reinhold Pub. Corp., New York, 1960, p. 249.

JAMES A. SEIDLECK, Primary Examiner

E. J. SMITH, Assistant Examiner

U.S. Cl. X.R.

252—429 C; 260—88.2 R